(12) United States Patent
Anderson et al.

(10) Patent No.: US 8,217,836 B1
(45) Date of Patent: Jul. 10, 2012

(54) TACTICAL RELATIVE NAVIGATION USING ORIENTATION TRANSFER AND RANGING

(75) Inventors: David A. Anderson, Coggon, IA (US); Patrick Y. Hwang, Cedar Rapids, IA (US); Joseph M. Kelly, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 237 days.

(21) Appl. No.: 12/713,659

(22) Filed: Feb. 26, 2010

(51) Int. Cl.
*G01S 5/02* (2010.01)
*G01S 3/02* (2006.01)
(52) U.S. Cl. ........................ 342/417; 342/463
(58) Field of Classification Search ............... 342/357.2, 342/357.34, 417, 443, 451, 463; 701/207, 701/412
See application file for complete search history.

(56) References Cited

U.S. PATENT DOCUMENTS

| | | | |
|---|---|---|---|
| 4,734,702 A * | 3/1988 | Kaplan | 342/424 |
| 5,379,045 A * | 1/1995 | Gilbert et al. | 342/357.36 |
| 2004/0119640 A1 * | 6/2004 | Menegozzi et al. | 342/418 |

* cited by examiner

*Primary Examiner* — Dao Phan
(74) *Attorney, Agent, or Firm* — Donna P. Suchy; Daniel M. Barbieri (57) ABSTRACT

A navigation system/solution, suitable for use in a GPS-denied environment, may be implemented via a node, the node being mounted on-board a vehicle, such as a tactical aircraft. The system/solution allows for a single component of the node to obtain/determine a bearing measurement (via an orientation transfer scheme) and a range measurement (via a round trip timing scheme) based upon signals transmitted between the node and a second node, and further allows for the bearing and range measurements to be received and processed by a navigation processor of the node for determining a location of the node.

17 Claims, 6 Drawing Sheets

TACTICAL RELATIVE NAVIGATION USING ORIENTATION TRANSFER AND RANGING

FIELD OF THE INVENTION

The present invention relates to the field of navigation systems and particularly to a system and method for providing tactical relative navigation using orientation transfer and ranging.

BACKGROUND OF THE INVENTION

Navigation in Global Positioning System-denied (GPS-denied) environments (ex.—environments, such as subterranean environments, in which GPS capabilities are not continuously available due to jamming, interference, and/or line-of-sight constraints) may present a big challenge which may require contribution from several smaller but complementary component solutions that include dead reckoning (ex.—image-based or pedometry-based) and local positioning systems (ex.—Radio Frequency (RF)-based). Local positioning systems which are based only on ranging measurements to multiple nodes that have known position information (ex.—of their own to share) may require that the latter are also well-distributed spatially in order to yield good geometry for getting a computed solution of good quality. In tactical operations, it is not uncommon for warfighters to sometimes be traversing tight corridors or cave tunnels that are highly restrictive to RF line-of-sight signals such that one can only expect reception from a single node at most, or from multiple nodes with a geometry which is not supportive of accurate positioning.

Thus, it would be desirable to provide a system/method for providing navigation which obviates the problems associated with current solutions.

SUMMARY OF THE INVENTION

Accordingly, an embodiment of the present invention is directed to a method for providing navigation, including: receiving a plurality of transmitted signals at a second node, the plurality of signals being transmitted from a first node; based upon said signals, determining an orientation angle of the second node with respect to a baseline adjoining the first node and the second node; based upon said signals, determining an orientation angle of the first node with respect to the baseline adjoining the first node and the second node; based upon the orientation angles and an azimuth measurement of the first node, determining an azimuth measurement for the second node; based upon at least one of: the orientation angle of the first node and the orientation angle of the second node, and further based upon at least one of: the azimuth measurement of the first node and the azimuth measurement of the second node, determining at least one of: a bearing measurement of the second node with respect to the first node, and a bearing measurement of the first node with respect to the second node; transmitting a ranging signal from the second node to the first node; receiving the ranging signal at the first node; determining a time difference between a time of transmission of the ranging signal from the second node and a time of reception of the ranging signal at the first node; based upon the received ranging signal, transmitting a return ranging signal from the first node to the second node; determining a time difference between a time of transmission of the return signal from the first node and a time of reception of the return signal at the second node; based upon the determined time differences, determining a range measurement between the first node and the second node; providing the range measurement and at least one of: the bearing measurement of the second node with respect to the first node, and the bearing measurement of the first node with respect to the second node, to a navigation processor of the second node; providing inertial measurements from an inertial sensor system of the second node to the navigation processor of the second node; providing dead reckoning system (ex.—image-based or pedometry-based) measurements from a dead reckoning system of the second node to the navigation processor of the second node; processing at least one of: the range measurement, the bearing measurement of the second node with respect to the first node, the bearing measurement of the first node with respect to the second node, the inertial measurements, and the dead reckoning system measurements via the navigation processor to provide position information of the second node.

An additional embodiment of the present invention is directed to a non-transitory computer-readable medium having computer-executable instructions for performing a method for providing navigation, said method including: receiving a plurality of transmitted signals at a second node, the plurality of transmitted signals being transmitted from a first node; based upon said signals, determining an orientation angle of the second node with respect to a baseline adjoining the first node and the second node; based upon said signals, determining an orientation angle of the first node with respect to the baseline adjoining the first node and the second node; based upon the orientation angles and an azimuth measurement of the first node, determining an azimuth measurement for the second node; based upon at least one of: the orientation angle of the first node and the orientation angle of the second node, and further based upon at least one of: the azimuth measurement of the first node and the azimuth measurement of the second node, determining at least one of: a bearing measurement of the second node with respect to the first node, and a bearing measurement of the first node with respect to the second node; transmitting a ranging signal from the second node to the first node; receiving the ranging signal at the first node; determining a time difference between a time of transmission of the ranging signal from the second node and a time of reception of the ranging signal at the first node; based upon the received ranging signal, transmitting a return ranging signal from the first node to the second node; determining a time difference between a time of transmission of the return signal from the first node and a time of reception of the return signal at the second node; based upon the determined time differences, determining a range measurement between the first node and the second node; providing the range measurement and at least one of: the bearing measurement of the second node with respect to the first node, and the bearing measurement of the first node with respect to the second node, to a navigation processor of the second node; providing inertial measurements from an inertial sensor system of the second node to the navigation processor of the second node; providing dead reckoning system measurements from a dead reckoning system of the second node to the navigation processor of the second node; processing at least one of: the range measurement, the bearing measurement of the second node with respect to the first node, the bearing measurement of the first node with respect to the second node, the inertial measurements, and the dead reckoning system measurements via the navigation processor to provide position information of the second node.

A further embodiment of the present invention is directed to a first node for providing navigation, including: a plurality of antennas, the plurality of antennas being configured for receiving and transmitting signals; a bearing-ranging component, the bearing-ranging component being connected to the plurality of antennas, the bearing-ranging component being configured for determining a range measurement and a bearing measurement based upon signals received from a second node; a navigation processor, the navigation processor being connected to the bearing-ranging component, the navigation processor configured for receiving the range measurement and the bearing measurement from the bearing-ranging component; an inertial sensor system, the inertial sensor system being connected to the navigation processor, the inertial sensor system being configured for providing inertial measurements to the navigation processor; and a dead reckoning system, the dead reckoning system being connected to the navigation processor, the dead reckoning system being configured for providing dead reckoning system measurements to the navigation processor, wherein the navigation processor is configured for processing the range measurement, the bearing measurement, the inertial measurements, and the dead reckoning system measurements for determining a position of the first node.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Navigation in Global Positioning System-denied (GPS-denied) environments may present a big challenge which may require contribution from several smaller but complementary component solutions that include dead reckoning (ex.—image-based or pedometry-based) and local positioning systems (ex.—Radio Frequency (RF)-based). Local positioning systems which are based only on ranging measurements to multiple nodes that have known position information (ex.—of their own to share) may require that the latter are also well-distributed spatially in order to yield good geometry for getting a computed solution of good quality. In tactical operations, it is not uncommon for warfighters to sometimes be traversing tight corridors or cave tunnels that are highly restrictive to RF line-of-sight signals such that one can only expect reception from a single node at most, or from multiple nodes with a geometry which is not supportive of accurate positioning.

The system(s)/method(s) of the exemplary embodiments of the present invention provide a range-bearing navigation solution for/promoting improved tactical relative navigation operations in restrictive environments, such as single corridors deep inside of buildings or cave tunnels. Further, said range-bearing navigation solution provided by the system(s)/method(s) of the exemplary embodiments of the present invention may be obtained via RF connectivity to a single node having known position information of its own to share. Range-bearing measurements are made from precise timing of range signals and bearing signals that are herein described separately for the different functions of ranging and bearing, although the two may be constructed from the same signal type and/or share the same signals.

Figure 1:
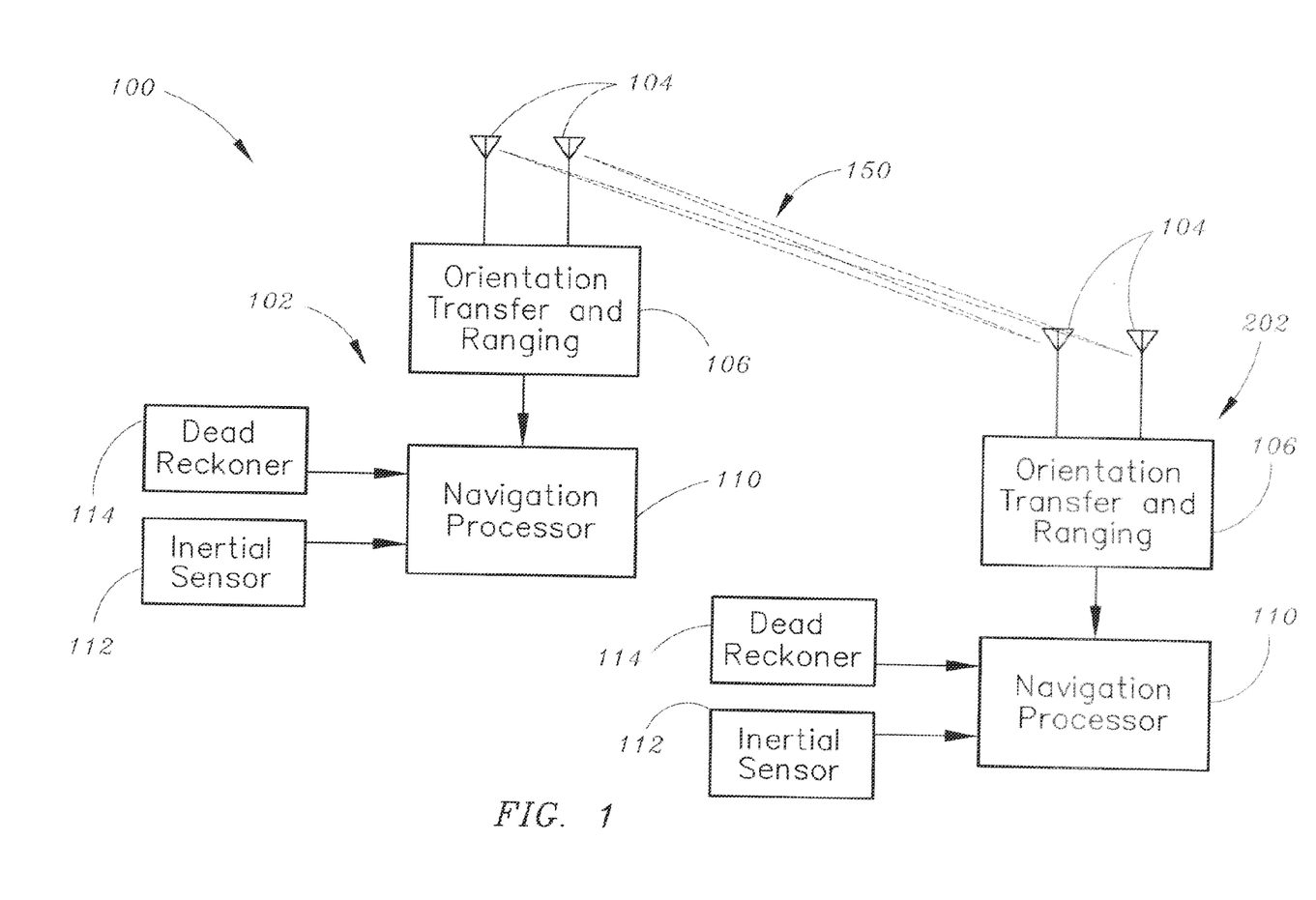
FIG. 1 is a block diagram schematic of a system for providing navigation in accordance with an exemplary embodiment of the present invention.
Figure 2A:
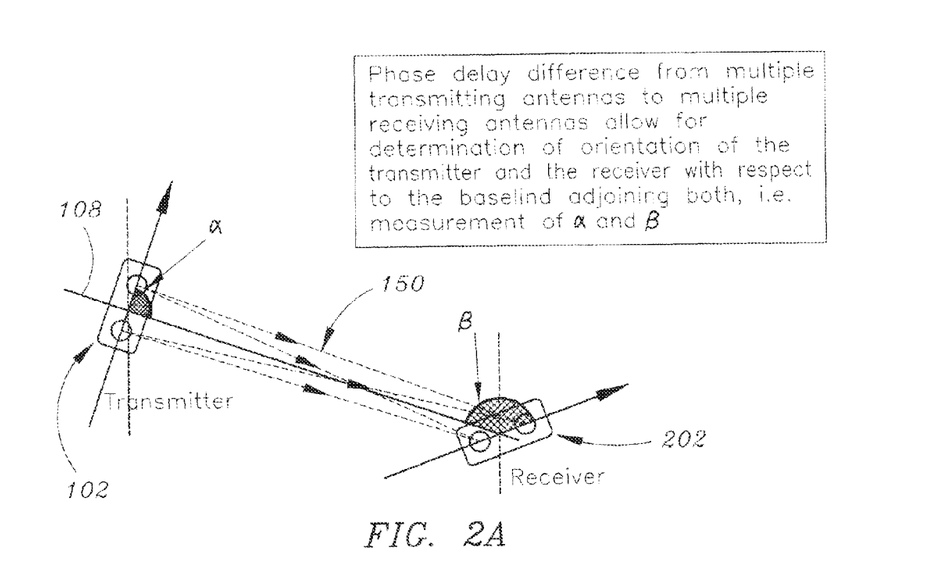
FIGS. 2A and 2B are block diagram schematics illustrating transmission of signals between two nodes of the system shown in FIG. 1, and determination of a bearing measurement based upon said signals in accordance with an exemplary embodiment of the present invention.
Figure 2B:
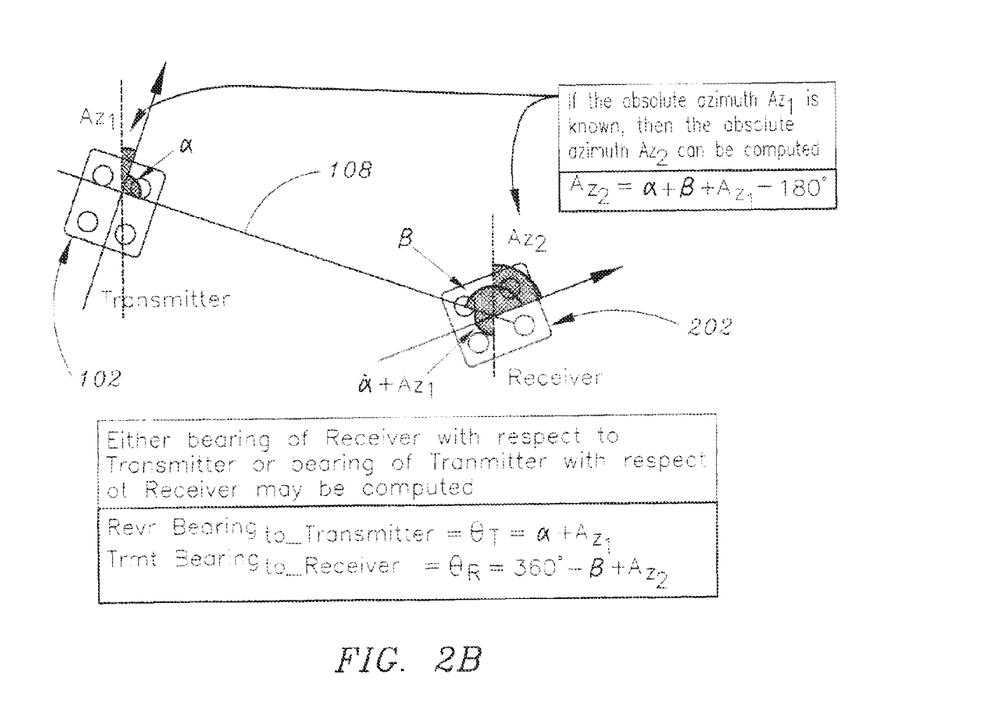

Referring generally to FIG. 1, a system for providing navigation in accordance with an exemplary embodiment of the present invention is shown. In an exemplary embodiment of the present invention, the system 100 may include a plurality of nodes, such as a first node 102 and a second node 202. For example, the node 102/202 may be a transceiver module on-board a vehicle, such as an aircraft/tactical aircraft. In further embodiments of the present invention, each node (102, 202) may include a plurality of antennas 104. In current embodiments of the present invention, the antennas 104 of each of the nodes (102, 202) may be configured for receiving and transmitting signals 150 (ex.—RF signals) for allowing RF connectivity to be provided between the first node 102 and the second node 202. For instance, as shown in FIG. 2, the first node 102 may be configured for transmitting signals 150 to the second node 202. Further, the second node 202 may be configured for receiving the transmitted signals 150 from the first node 102. In a first alternative exemplary embodiment of the system 100 of the present invention, each node (102, 202) may include a single transmitting antenna and multiple receiving antennas. Said first alternative exemplary embodiment of the system 100 of the present invention provides the advantages of only requiring one type of node and directly supporting two-way ranging. In a second alternative exemplary embodiment of the system 100 of the present invention, each node (102, 202) may include a single receiving antenna and multiple transmitting antennas.

In exemplary embodiments of the present invention, each of the nodes (102, 202) may include a bearing-ranging component 106 (ex.—an orientation transfer and ranging component). In further embodiments of the present invention, the bearing-ranging component 106 may be connected to the antennas 104. In additional embodiments of the present invention, the bearing-ranging component 106 may be configured for determining a range measurement based upon signals transmitted/received by the node(s) (102, 202). In still further embodiments of the present invention, the bearing-ranging component 106 (ex.—the orientation transfer and ranging component 106) may be configured for determining a bearing measurement based upon signals 150 transmitted/ received by the nodes (102, 202). The manner in which the bearing-ranging component 106 determines the range measurement and the bearing measurement will be described in detail below.

As mentioned above, the antennas 104 of each of the nodes (102, 202) may be configured for receiving/transmitting signals 150 (ex.—RF signals) for allowing RF connectivity to be provided between the first node 102 and the second node 202. In an illustrated embodiment of the present invention, as shown in FIGS. 2A and 2B, the first node 102 may transmit a plurality of signals 150 which are received by the second node 202. Based upon the received signals 150, the bearing-ranging component 106 of the second node 202 may be configured for determining a bearing measurement. In exemplary embodiments of the present invention, the bearing-ranging component 106 may implement an orientation transfer scheme for determination of the bearing measurement, as will be described below.

Determination of the bearing measurement by the bearing-ranging component 106 may include measuring a direction-of-arrival of a signal(s) being transmitted from the transmitting node 102. Time differences or phase delay differences from the antennas 104 of the first node 102 (ex.—the transmitting node 102) to the antennas 104 of the second node 202 (ex.—the receiving node 202) allow for determination of orientation of the transmitting node/transmitter 102 and the receiving node/receiver 202 with respect to a baseline 108 adjoining both nodes (102, 202). For example, based upon the transmitted/received signals 150, the bearing-ranging component 106 may be configured for determining an orientation angle (β) of the second node 202 with respect to the baseline 108 adjoining the first node 102 and the second node 202. Further, based upon the transmitted/received signals 150, the bearing-ranging component 106 may be further configured for determining an orientation angle (α) of the first node 102 with respect to the baseline 108 adjoining the first node 102 and the second node 202.

Determination of the bearing measurement by the bearing-ranging component 106 may further be based upon a direction in azimuth in which the receiving node 202 is oriented. In exemplary embodiments of the present invention, based upon the orientation angles (α and β) and an azimuth measurement ($Az_1$) of the first node 102, the bearing-ranging component 106 may be configured for determining an azimuth measurement ($Az_2$) of the second node 202. For example, if absolute azimuth ($Az_1$) of the first node 102 is known, then absolute azimuth ($Az_2$) of the second node 202 may be computed via the following equation:

$$Az_2 = \alpha + \beta + Az_1 - 180°$$

In further embodiments of the present invention, either the bearing ($\Theta_T$) of the receiver 202 with respect to the transmitter 102, or the bearing ($\Theta_R$) of the transmitter 102 with respect to the receiver 202 may be computed via the following equations:

$$\Theta_T = \alpha + Az_1$$

$$\Theta_R = 360° - \beta + Az_2$$

The orientation transfer scheme allows for bearing measurements to be made without having to implement cumbersome rotating mechanisms, such as those found in early or older Tactical Air Navigation (TACAN) systems. Thus, the proposed navigation solution of the present invention allows for compact equipage/small form factor of the bearing-ranging component(s) 106/nodes (102, 202).

Figure 3:
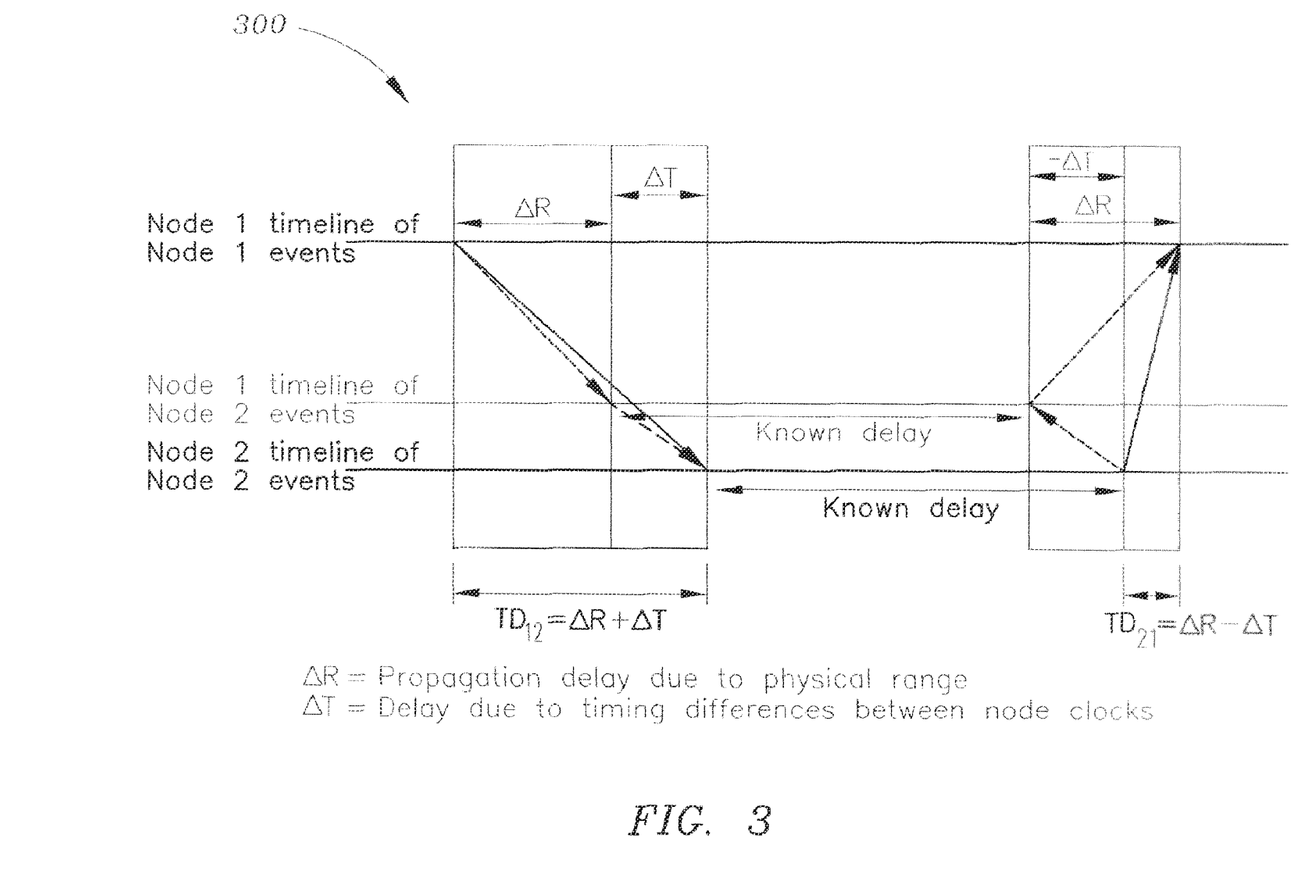
FIG. 3 is a timing schematic illustrating a round-trip timing sequence which may be implemented by the nodes of the system of FIG. 1 for determining a range measurement in accordance with an exemplary embodiment of the present invention.

As mentioned above, the bearing-ranging component 106 may be configured for determining a range measurement based upon signals transmitted/received by the node(s) (102, 202). In exemplary embodiments, as shown in FIG. 3, a round trip timing scheme 300 may be implemented by the bearing-ranging component 106 for determining the range measurement. For instance, in the round trip timing scheme 300, the second node 202 may be configured for transmitting a ranging signal (ex.—a signal which provides range and time transfer information) from the second node 202 to the first node 102. In further embodiments, the ranging signal may provide range information and time transfer information. Further, the first node 102 may be configured for receiving the ranging signal. A time difference between a time of transmission of the ranging signal from the second node and a time of reception of the ranging signal at the second node may then be determined by the system 100/bearing-ranging component(s) 106. In further embodiments, based upon the received ranging signal, the first node 102 may be configured for transmitting a return ranging signal from the first node 102 to the second node 202. The system 100/bearing-ranging component(s) 106 may be further configured for determining a time difference between a time of transmission of the return signal from the first node 102 and a time of reception of the return signal at the second node 202. The above two measurements (the time difference between the time of transmission of the ranging signal from the second node and the time of reception of the ranging signal at the second node; the time difference between the time of transmission of the return signal from the first node 102 and a time of reception of the return signal at the second node 202) may intrinsically contain information about physical range between the two nodes (102, 202) and the timing difference between the nodes' respective clocks. Further, relative range and relative timing may be solved directly from these two measurements. Thus, based upon the determined time differences, the bearing-ranging component(s) 106 may be configured for determining a range measurement between the first node 102 and the second node 202. In alternative embodiments, the first half of the ranging (ex.—from the first node 102 to the second node 202) may be made by the plurality of signals (ex.—bearing signals) 150 which are transmitted from the first node 102 to the second node 202, wherein said signals 150 may act as ranging signals and a ranging-specific signal (ex.—a return ranging signal) may be returned from the second node 202 to the first node 102.

As shown in FIG. 3, a time difference ($TD_{12}$) (ex.—difference between transmit time and receive time) between the first node 102 and the second node 202 may be equal to the sum of: a propagation delay due to physical range ($\Delta R$) and a delay due to timing differences between the node clocks ($\Delta T$). Further, as shown in FIG. 3, a time difference ($TD_{21}$) between the second node 202 and the first node 102 may be equal to the difference between the propagation delay due to physical range ($\Delta R$) and the delay due to timing differences between the node clocks ($\Delta T$).

In further alternative exemplary embodiments of the present invention, if the nodes (102, 202) are time synchronized, the system 100 may implement one-way ranging rather than implementing two-way round trip timing for ranging. In still further alternative exemplary embodiments of the present invention, if the system 100 is implementing two-way ranging, it may not be necessary for the nodes (102, 202) to compute the time difference between transmit and receive for each transmission, but rather a difference between a time of transmission of a first transmission and a time of receipt of a second transmission may be computed.

In exemplary embodiments of the present invention, each node (102, 202) may be further configured with a navigation processor 110. The navigation processor 110 may be connected to the bearing-ranging component 106. The bearing ranging component may be configured for providing range measurement(s) and bearing measurement(s) to the navigation processor 110. The navigation processor 110 may be configured for receiving the range measurement(s) and the bearing measurement(s) from the bearing-ranging component 106.

In further embodiments of the present invention, each node (102, 202) may further include an inertial sensor system 112. The inertial sensor system 112 may be connected to the navigation processor 110 and may be configured for providing inertial measurements to the navigation processor 110. In still further embodiments of the present invention, each node (102, 202) may further include a dead reckoning system 114 (ex.—an image-based or pedometry-based dead reckoning system). The dead reckoning system may be connected to the navigation processor 110 and may be configured for providing dead reckoning system measurements to the navigation processor 110.

In additional embodiments, the navigation processor 110 of each node (102, 202) is configured for processing the range measurement(s) and the bearing measurement(s) for determining position(s)/location(s) of the node(s) (102, 202). In further embodiments, the navigation processor 110 of each node (102, 202) may be further configured for processing the inertial measurements and the dead reckoning system measurements in addition to the range measurement(s) and the bearing measurement(s) for determining position(s)/location(s) of the node(s) (102, 202).

Figure 4:
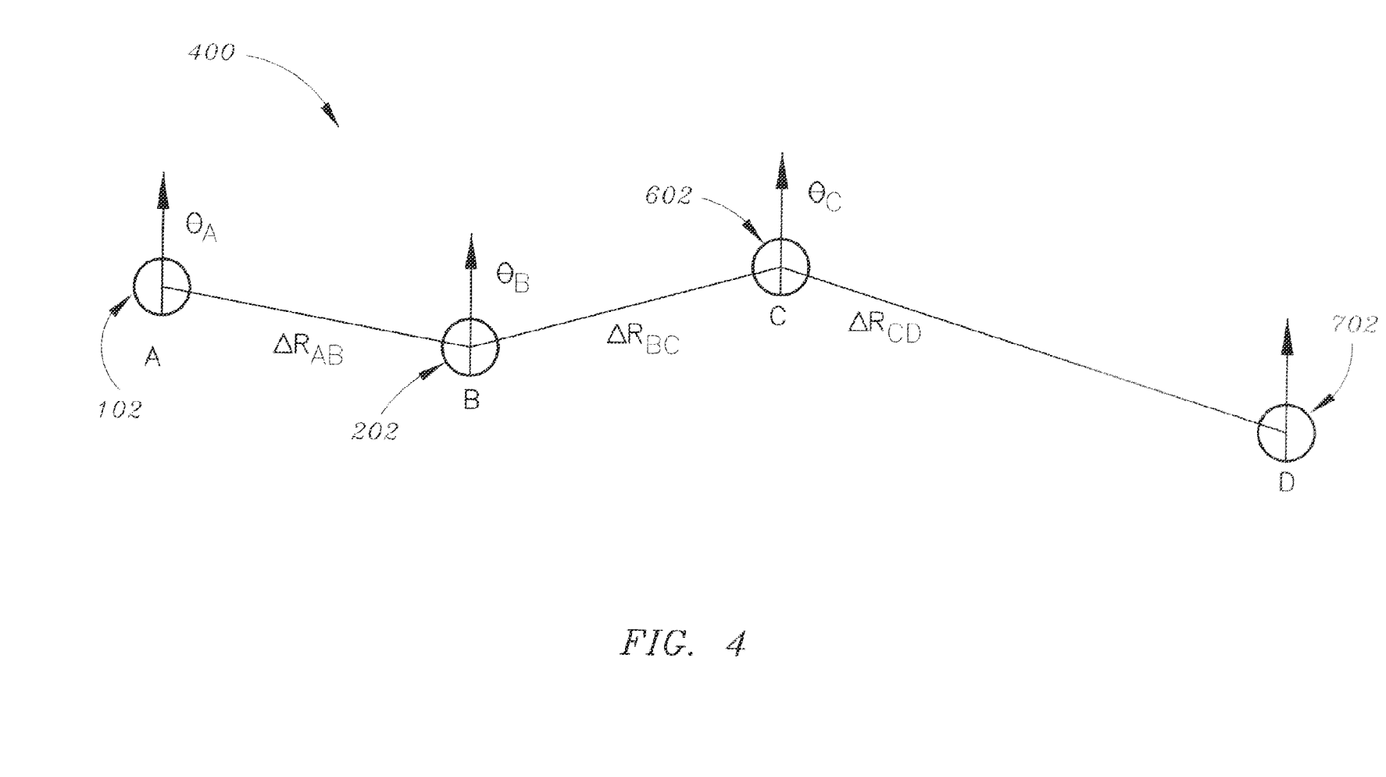
FIG. 4 is a communication/linkage schematic for exchanging position and orientation information among multiple nodes of a navigation system, such as the system of FIG. 1 in accordance with an exemplary embodiment of the present invention.

Referring to FIG. 4, a communication/linkage schematic shows the first node 102 (ex.—node A) and the second node 202 (ex.—node B) as part of a group 400 of communicatively coupled nodes which also includes node C (602) and node D (702) as shown. In tactical relative navigation, a known position of node A may be exploited to determine the position of node B using the range ($\Delta R_{AB}$) and bearing ($\Theta_A$) measurements made between the two nodes. Simultaneously/concurrently, the azimuth of node B may be determined from a known azimuth of node A using the angular measurements made via the above-described orientation transfer scheme. If node A serves as a reference node by obtaining very accurately surveyed position and azimuth via other methods, then said accurately surveyed position and azimuth of node A may be shared/transmitted to node B via the RF connection between nodes A and B. Further, node B can share/transmit the position and azimuth information it derived/obtained from node A with node C, and so forth.

Although, the shared information may gradually degrade in quality when passed from one node to the next, such sharing of position and azimuth information down a linkage of nodes 400 may still be very useful to a large extent depending on the quality of the range and bearing measurements. However, difficulties may arise if the nodes are in constant motion and measurements between the nodes of the plurality/linkage of nodes 400 are not simultaneously/concurrently made. To support a system of dynamic nodes, inertial sensor systems/inertial sensors 112 as described above (for highly-stable inertial measurements of orientation changes) and a dead reckoning system 114 as described above (ex.—either image-based or pedometry-based) may be included/implemented in each node included in the linkage group 400 of nodes. The use of the inertial sensors 112 may allow for all measurement information to be properly integrated even when said measurements/measurement information is not obtained/made simultaneously/concurrently. Measurements of range and bearing may require very high accuracy and may need to be highly tolerant against multipath problems. In exemplary embodiments of the present invention, ultra-wideband modulation waveforms may be implemented by the systems/methods of the present invention for ensuring such level of robustness.

In further alternative exemplary embodiments of the present invention, the system 100 may implement/utilize bearing measurements without utilizing range measurements.

Figure 5A:
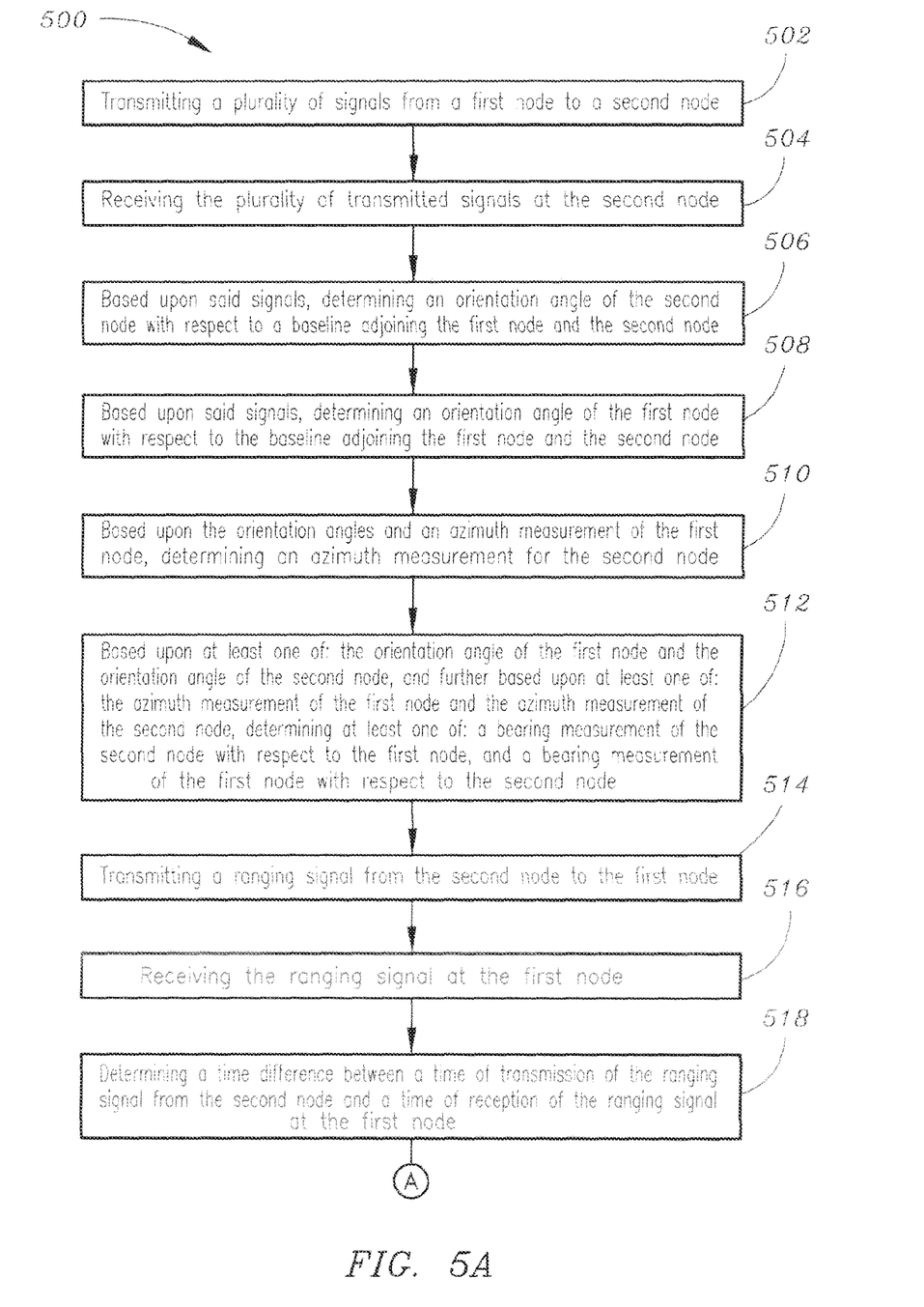
FIGS. 5A and 5B depict a flowchart illustrating a method for providing navigation, such as via the system of FIG. 1, in accordance with an exemplary embodiment of the present invention.
Figure 5B:
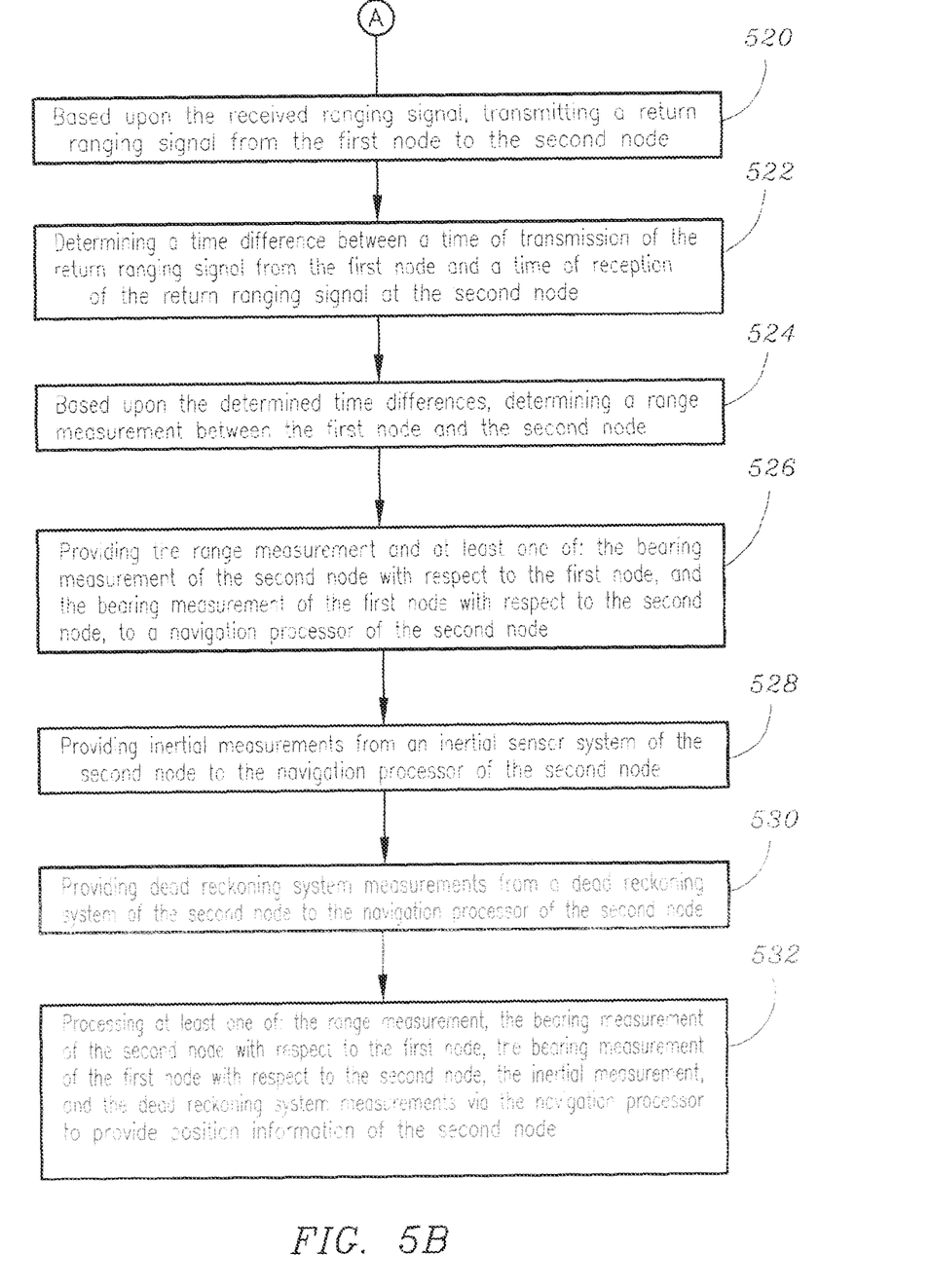

Referring to FIGS. 5A and 5B, a flow chart illustrating a method for providing navigation in accordance with an exemplary embodiment of the present invention is shown. The method 500 may include the step of transmitting a plurality of signals from a first node to a second node 502. The method 500 may further include receiving the plurality of transmitted signals at the second node 504. The method 500 may further include, based upon said signals, determining an orientation angle of the second node with respect to a baseline adjoining the first node and the second node 506. The method 500 may further include, based upon said signals, determining an orientation angle of the first node with respect to the baseline adjoining the first node and the second node 508.

In exemplary embodiments of the present invention, the method 500 may further include the step of, based upon the orientation angles and an azimuth measurement of the first node, determining an azimuth measurement for the second node 510. The method 500 may further include, based upon at least one of: the orientation angle of the first node and the orientation angle of the second node, and further based upon at least one of: the azimuth measurement of the first node and the azimuth measurement of the second node, determining at least one of: a bearing measurement of the second node with respect to the first node, and a bearing measurement of the first node with respect to the second node 512. The method 500 may further include transmitting a ranging signal from the second node to the first node 514. The method 500 may further include receiving the ranging signal at the first node 516. The method 500 may further include determining a time difference between a time of transmission of the ranging signal from the second node and a time of reception of the ranging signal at the first node 518.

In current embodiments of the present invention, the method 500 may further include based upon the received ranging signal, transmitting a return ranging signal from the first node to the second node 520. The method 500 may further include determining a time difference between a time of transmission of the return signal from the first node and a time of reception of the return signal at the second node 522. The method 500 may further include, based upon the determined time differences, determining a range measurement between the first node and the second node 524. The method 500 may further include providing the range measurement and at least one of: the bearing measurement of the second node with respect to the first node, and the bearing measurement of the first node with respect to the second node, to a navigation processor of the second node 526. The method 500 may further include providing inertial measurements from an inertial sensor system of the second node to the navigation processor of the second node 528. The method 500 may further include providing dead reckoning system measurements from a dead reckoning system of the second node to the navigation processor of the second node 530. The method 500 may further include processing at least one of: the range measurement, the bearing measurement of the second node with respect to the first node, the bearing measurement of the first node with respect to the second node, the inertial measurements, and the dead reckoning system measurements via the navigation processor to provide position information of the second node 532.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing navigation, comprising:
   receiving a plurality of transmitted signals at a second node, the plurality of signals being transmitted from a first node;
   based upon said signals, determining an orientation angle of the second node with respect to a baseline adjoining the first node and the second node; and
   based upon said signals, determining an orientation angle of the first node with respect to the baseline adjoining the first node and the second node;
   based upon the orientation angles and an azimuth measurement of the first node, determining an azimuth measurement for the second node;
   based upon at least one of: the orientation angle of the first node and the orientation angle of the second node, and further based upon at least one of: the azimuth measurement of the first node and the azimuth measurement of the second node, determining at least one of: a bearing measurement of the second node with respect to the first node, and a bearing measurement of the first node with respect to the second node.

2. A method as claimed in claim 1, further comprising:
   transmitting a ranging signal from the second node to the first node;
   receiving the ranging signal at the first node; and
   determining a time difference between a time of transmission of the ranging signal from the second node and a time of reception of the ranging signal at the first node.

3. A method as claimed in claim 2, further comprising:
   based upon the received ranging signal, transmitting a return ranging signal from the first node to the second node; and
   determining a time difference between a time of transmission of the return signal from the first node and a time of reception of the return signal at the second node.

4. A method as claimed in claim 3, further comprising:
   based upon the determined time differences, determining a range measurement between the first node and the second node.

5. A method as claimed in claim 4, further comprising:
   providing the range measurement and at least one of: the bearing measurement of the second node with respect to the first node, and the bearing measurement of the first node with respect to the second node, to a navigation processor of the second node.

6. A method as claimed in claim 5, further comprising:
   providing inertial measurements from an inertial sensor system of the second node to the navigation processor of the second node.

7. A method as claimed in claim 6, further comprising:
   providing dead reckoning system measurements from a dead reckoning system of the second node to the navigation processor of the second node.

8. A method as claimed in claim 7, further comprising:
   processing at least one of: the range measurement, the bearing measurement of the second node with respect to the first node, the bearing measurement of the first node with respect to the second node, the inertial measurements, and the dead reckoning system measurements via the navigation processor to provide position information of the second node.

9. A non-transitory computer-readable medium having computer-executable instructions for performing a method for providing navigation, said method comprising:
   receiving a plurality of transmitted signals at a second node, the plurality of signals being transmitted from a first node;
   based upon said signals, determining an orientation angle of the second node with respect to a baseline adjoining the first node and the second node; and
   based upon said signals, determining an orientation angle of the first node with respect to the baseline adjoining the first node and the second node;
   based upon the orientation angles and an azimuth measurement of the first node, determining an azimuth measurement for the second node; and
   based upon at least one of: the orientation angle of the first node and the orientation angle of the second node, and further based upon at least one of: the azimuth measurement of the first node and the azimuth measurement of the second node, determining at least one of: a bearing measurement of the second node with respect to the first node, and a bearing measurement of the first node with respect to the second node.

10. A non-transitory computer-readable medium as claimed in claim 9, said method further comprising:
    transmitting a ranging signal from the second node to the first node;

receiving the ranging signal at the first node; and determining a time difference between a time of transmission of the ranging signal from the second node and a time of reception of the ranging signal at the first node.

11. A non-transitory computer-readable medium as claimed in claim 10, said method further comprising:

based upon the received ranging signal, transmitting a return ranging signal from the first node to the second node; and determining a time difference between a time of transmission of the return signal from the first node and a time of reception of the return signal at the second node.

12. A non-transitory computer-readable medium as claimed in claim 11, said method further comprising:

based upon the determined time differences, determining a range measurement between the first node and the second node.

13. A non-transitory computer-readable medium as claimed in claim 12, said method further comprising:

providing the range measurement and at least one of: the bearing measurement of the second node with respect to the first node, and the bearing measurement of the first node with respect to the second node, to a navigation processor of the second node.

14. A non-transitory computer-readable medium as claimed in claim 13, said method further comprising:

providing inertial measurements from an inertial sensor system of the second node to the navigation processor of the second node.

15. A non-transitory computer-readable medium as claimed in claim 14, said method further comprising:

providing dead reckoning system measurements from a dead reckoning system of the second node to the navigation processor of the second node.

16. A non-transitory computer-readable medium as claimed in claim 15, said method further comprising:

processing at least one of: the range measurement, the bearing measurement of the second node with respect to the first node, the bearing measurement of the first node with respect to the second node, the inertial measurements, and the dead reckoning system measurements via the navigation processor to provide position information of the second node.

17. A first node for providing navigation, comprising:

a plurality of antennas, the plurality of antennas being configured for receiving and transmitting signals;

a bearing-ranging component, the bearing-ranging component being connected to the plurality of antennas, the bearing-ranging component being configured for determining a range measurement and a bearing measurement based upon signals received from a second node;

a navigation processor, the navigation processor being connected to the bearing-ranging component, the navigation processor configured for receiving the range measurement and the bearing measurement from the bearing-ranging component;

an inertial sensor system, the inertial sensor system being connected to the navigation processor, the inertial sensor system being configured for providing inertial measurements to the navigation processor; and a dead reckoning system, the dead reckoning system being connected to the navigation processor, the dead reckoning system being configured for providing dead reckoning system measurements to the navigation processor, wherein the navigation processor is configured for processing the range measurement, the bearing measurement, the inertial measurements, and the dead reckoning system measurements for determining a position of the first node.

* * * * *